(12) United States Patent
Wilensky et al.

(10) Patent No.: US 9,070,230 B2
(45) Date of Patent: Jun. 30, 2015

(54) SIMULATING STROBE EFFECTS WITH DIGITAL IMAGE CONTENT

(71) Applicant: Adobe Systems Incorporated, San Jose, CA (US)

(72) Inventors: Gregg D. Wilensky, Pacific Palisades, CA (US); Sarah Aye Kong, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 169 days.

(21) Appl. No.: 13/948,301

(22) Filed: Jul. 23, 2013

(65) Prior Publication Data
US 2015/0030246 A1    Jan. 29, 2015

(51) Int. Cl.
*G06K 9/40* (2006.01)
*G06T 11/60* (2006.01)
*G06T 11/00* (2006.01)

(52) U.S. Cl.
CPC ............... *G06T 11/60* (2013.01); *G06T 11/001* (2013.01)

(58) Field of Classification Search
CPC ....... G06T 15/80; G06T 11/001; G06T 11/60; H04N 1/4092
USPC ................. 382/167, 254, 275, 284; 348/579
See application file for complete search history.

(56) References Cited

U.S. PATENT DOCUMENTS

| | | | |
|---|---|---|---|
| 6,115,078 A * | 9/2000 | Kino | 348/625 |
| 2003/0095714 A1 * | 5/2003 | Avinash | 382/260 |
| 2004/0125115 A1 * | 7/2004 | Takeshima et al. | 345/634 |
| 2005/0030315 A1 * | 2/2005 | Cohen et al. | 345/538 |
| 2008/0025627 A1 * | 1/2008 | Freeman et al. | 382/255 |
| 2008/0175507 A1 * | 7/2008 | Lookingbill et al. | 382/255 |
| 2009/0256947 A1 * | 10/2009 | Ciurea et al. | 348/333.12 |
| 2012/0002112 A1 * | 1/2012 | Huang et al. | 348/579 |
| 2012/0293538 A1 * | 11/2012 | Ording | 345/592 |
| 2013/0162817 A1 * | 6/2013 | Bernal | 348/143 |

OTHER PUBLICATIONS

Navarro et al. ("Motion Blur Rendering: State of the Art," Computer Graphics Forum, vol. 30, No. 1, 2011, pp. 3-26).*
Schmid et al. ("Programmable Motion Effects," ACM transactions on Graphics, vol. 29, No. 4, Jul. 2010).*

* cited by examiner

*Primary Examiner* — Yubin Hung
(74) *Attorney, Agent, or Firm* — Kilpatrick Townsend & Stockton LLP

(57) ABSTRACT

Systems and methods are provided for simulating strobe effects with digital image content. In one embodiment, an image manipulation application can receive image content. The image manipulation application can generate blurred image content by applying a blurring operation to a portion of the received image content along a blur trajectory. The image manipulation application can sample pixels from multiple positions in the received image content along the blur trajectory. The image manipulation application can generate a simulated strobe images based on the sampled pixels and at least some of the blurred image content.

24 Claims, 13 Drawing Sheets

902

SIMULATING STROBE EFFECTS WITH DIGITAL IMAGE CONTENT

TECHNICAL FIELD

This disclosure relates generally to computer-implemented methods and systems and more particularly relates to simulating strobe effects with digital image content.

COPYRIGHT NOTIFICATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Photographs with strobe effects can be captured using a camera and one or more strobe lights. A strobe light or stroboscopic lamp can be flashed repeatedly as a camera shutter is open. Repeatedly flashing a strobe light as a camera shutter is open can allow a photographer to capture a group of images closely spaced in time. Capturing a group of images closely spaced in time may provide a stop motion effect for objects in the images. For example, a strobe light having a bright flash can be flashed multiple times as a camera images a space in which a person is walking. A resultant group of images having a stop motion effect can include intermittent images of the steps taken by the person during the walk.

It is desirable to apply strobe effects to digital image content captured without the use of physical strobe lights.

SUMMARY

One embodiment involves an image manipulation application being executed by a processor to receive image content. The embodiment further involves the image manipulation application generating blurred image content by applying a blurring operation to a portion of the received image content along a blur trajectory. The embodiment further involves the image manipulation application sampling multiple pixels from multiple positions in the received image content along the blur trajectory. The embodiment further involves the image manipulation application generating a simulated strobe image based on the pixels sampled from the received image content and at least some of the blurred image content.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
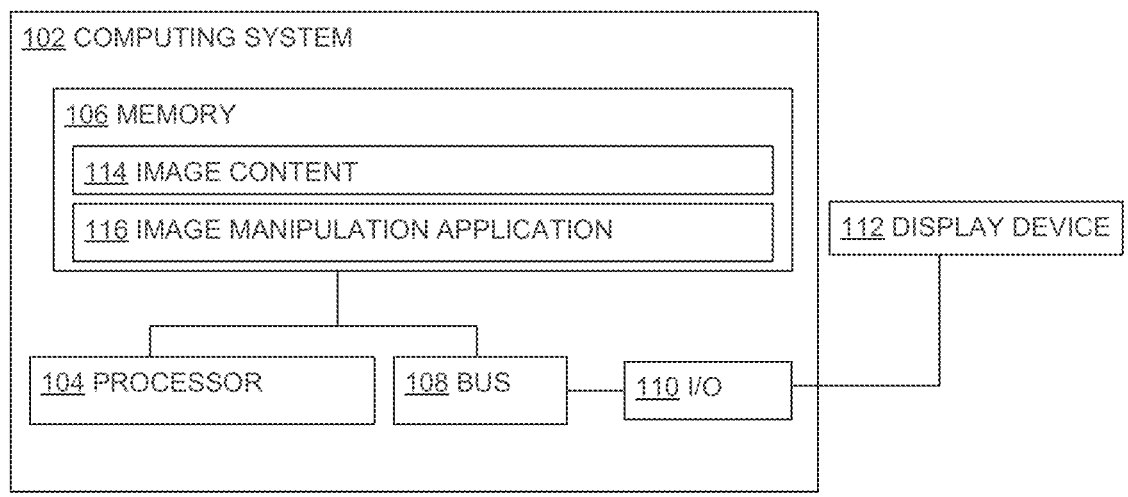
FIG. 1 is a block diagram depicting an example computing system for implementing certain embodiments.

Computer-implemented systems and methods are disclosed for simulating strobe effects with digital image content. Using an image manipulation application to simulate strobe effects can allow strobe effects to be applied to an image that was captured without the use of physical strobe light equipment.

The following non-limiting example is provided to help introduce the general subject matter of certain embodiments. An image manipulation application can be used to apply strobe effects to a single image of a wheel and thereby generate a group of images in which rotation of the wheel is simulated. The image manipulation application can blur at least a portion of an image. Blurring a portion of the image can simulate motion of an object depicted in the image, such as the rotation of spokes of the wheel depicted in the image. The simulated motion of the image can follow a given path, such as a clockwise motion of the spokes. The image manipulation application can sample un-blurred portions of the original image at intervals along the path. The un-blurred portions sampled along the path can simulate portions of a depicted object being illuminated by a flash of a strobe light. The image manipulation application can blend or otherwise combine the blurred image content with the samples of un-blurred image content to generate a simulated strobe image simulating an image captured during a strobe flash. For example, a simulated strobe image of a spinning wheel can include blurred portions of the wheel along with un-blurred or relatively sharper portions depicting spokes of the wheel. The un-blurred or relatively sharper image portions depicting the spokes can simulate a strobe flash illuminating the spokes. The image manipulation application can repeat this process using different samples from different positions along the simulated path of motion (i.e., sampling different sets of un-blurred spokes of the wheel) to generate multiple simulated strobe images. The multiple simulated strobe images can simulate capturing a group of images by repeatedly flashing a physical strobe light at the spinning wheel during a period in which a camera shutter is open.

In accordance with one embodiment, an image manipulation application is provided for simulating strobe effects with digital image content. The image manipulation application can receive image content from any suitable source. For example, an image manipulation application can be executed on a computing system to retrieve digital image content from a storage device. The image manipulation application can generate blurred image content from the received image content. The blurred image content can be generated by applying a blurring operation to a portion of the received image content along a blur trajectory. The image manipulation application can generate multiple simulated strobe images by applying strobe effects to the blurred image content and the received image content. Applying the strobe effects can include, for each simulated strobe image, sampling pixels from positions in the received image content along the blur trajectory and blending the sampled pixels with the blurred image content to generate the simulated strobe image. The simulated strobe image can include blurred image portions simulating a moving object illuminated by ambient light and sharper image portions simulating a moving object illuminated by a strobe light.

As used herein, the term "blurring operation" is used to refer to one or more operations for decreasing the sharpness of one or more portions of image content. Decreasing the sharpness of one or more portions of image content can include modifying transitions between zones of different color in the image such that the transitions are more gradual as compared to an un-blurred version of the image. A blurring operation can simulate movement of a camera or an object imaged by the camera during a time period in which the shutter of the camera is open or the image is otherwise being captured.

As used herein, the term "blur trajectory" is used to refer to a trajectory along which a blurring operation is applied. Applying a blurring operation to blur image portions along the blur trajectory can simulate blurring of an image along a direction of movement of the camera or an imaged object during a time period in which the image is captured. The blur trajectory can be defined by any suitable function. For example, the blur trajectory can be a straight line, a quadratic curve, etc.

As used herein, the term "strobe effect" is used to refer to one or more operations for simulating the effect of a strobe light illuminating an object during a time period in which the shutter of the camera is open or the image is otherwise being captured. A strobe effect can sharpen blurred image portions such that a resulting simulated strobe image has features similar to an image captured using a camera and a physical strobe light or stroboscopic lamp. A strobe effect can be performed multiple times with different parameters on a single image to generate multiple simulated strobe images.

As used herein, the term "simulated strobe image" is used to refer to an image generated by applying a strobe effect to an input image. One or more image portions depicted in a simulated strobe image can be similar to corresponding image portions depicted in an image captured using a camera and a physical strobe light.

Referring now to the drawings, FIG. 1 is a block diagram depicting an example computing system 102 for implementing certain embodiments.

The computing system 102 comprises a computer-readable medium such as a processor 104 that is communicatively coupled to a memory 106 and that executes computer-executable program instructions and/or accesses information stored in the memory 106. The processor 104 may comprise a microprocessor, an application-specific integrated circuit ("ASIC"), a state machine, or other processing device. The processor 104 can include any of a number of computer processing devices, including one. Such a processor can include or may be in communication with a computer-readable medium storing instructions that, when executed by the processor 104, cause the processor to perform the steps described herein.

The computing system 102 may also comprise a number of external or internal devices such as input or output devices. For example, the computing system 102 is shown with an input/output ("I/O") interface 110 and a display device 112. A bus 108 can also be included in the computing system 102. The bus 108 can communicatively couple one or more components of the computing system 102.

The computing system 102 can modify, access, or otherwise use image content 114. The image content 114 may be resident in any suitable computer-readable medium and execute on any suitable processor. In one embodiment, the image content 114 can reside in the memory 106 at the computing system 102. In another embodiment, the image content 114 can be accessed by the computing system 102 from a remote content provider via a data network.

The memory 106 can include any suitable computer-readable medium. A computer-readable medium may comprise, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A image manipulation application 116 stored in the memory 106 can configure the processor 104 to prepare the image content 114 for rendering in a graphical interface and/or render the image content 114 in the graphical interface. In some embodiments, the image manipulation application 116 can be a software module included in or accessible by a separate application executed by the processor 104 that is configured to modify, access, or otherwise use the image content 114. In other embodiments, the image manipulation application 116 can be a stand-alone application executed by the processor 104.

The computing system 102 can include any suitable computing device for executing the image manipulation application 116. Non-limiting examples of a computing device include a desktop computer, a tablet computer, a laptop computer, or any other computing device suitable for rendering the image content 114.

Figure 2:
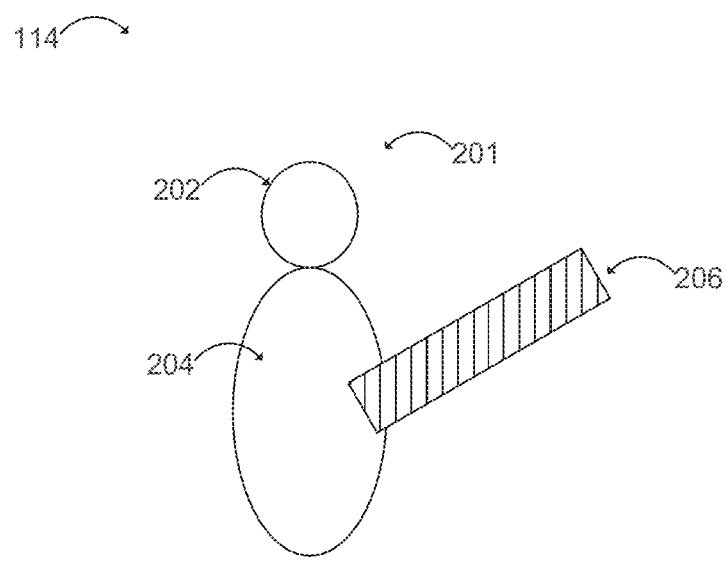
FIG. 2 is a modeling diagram depicting example image content to which strobe effects may be applied.
Figure 3:
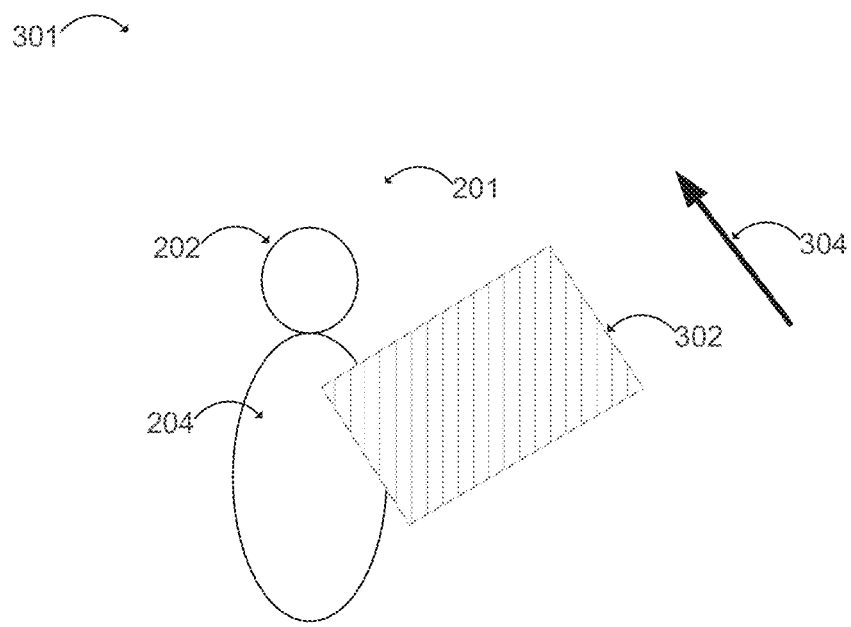
FIG. 3 is a modeling diagram depicting blurring of the example image content for application of strobe effects.

FIG. 2 is a modeling diagram depicting example image content 114 to which strobe effects may be applied. The image content 114 can include a FIG. 201 having a head 202, a torso 204, and an arm 206. The image manipulation application 116 can be used to select one or more portions of the image content 114 to which a strobe effect is to be applied. For example, the image manipulation application 116 can select the arm 206 to be blurred. FIG. 3 is a modeling diagram depicting blurring of the example image content 114 for application of strobe effects. As depicted in FIG. 3, a blurred image 301 can include the FIG. 201 with the un-blurred head 202, the un-blurred torso 204, and the blurred arm 302. The arm 206 from FIG. 2 can be blurred to generate the blurred arm 302.

Selecting image portion(s) to which a strobe effect is to be applied can include identifying image portion(s) to be blurred using a blurring operation. In some embodiments, a visual indicator can be positioned on an image to indicate a portion of the image to be blurred. Positioning a single visual indicator on the image can cause the image manipulation application 116 to apply a blurring operation along a straight line or a curve. Positioning multiple visual indicators on the image can cause the image manipulation application 116 to apply multiple blurring operations in multiple directions to the image. In other embodiments, a visual indicator can be positioned on an image to indicate an image portion that is to remain un-blurred. A blurring operation can be applied to image portions lacking the image visual indicator. Non-limiting examples of visual indicators include marking points, image masks, and the like.

A blurring operation can simulate motion of a camera or an imaged object as an image is captured. For example, a camera can include a sensor element and a shutter. Capturing data from the sensor element as the shutter is open and the camera is moving relative to an imaged object can cause the camera to capture accumulating image intensities along a path corresponding to the motion over the camera. A blurring operation can modify intensity values for different pixels in an image along a blur trajectory to generate a similar effect. The blur trajectory can indicate the simulated direction of motion for a camera.

A blurring operation can include any suitable shape for a blur kernel to generate the blur trajectory. A blur kernel can include data representing or otherwise describing the movement of a camera or other imaging device during the recording of image content. The blur kernel can be data that represents or otherwise describes blurring of image content 114 resulting from movement of a camera used to capture the image content.

The image manipulation application 116 can select a blur trajectory to be used for the blurring operation. A blur trajectory can correspond to movement of a camera or an object imaged by the camera as a camera shutter is open. For example, the image manipulation application 116 can select a blur trajectory 304 depicted in FIG. 3 as an arrow pointing to the upper left. The blur trajectory 304 can correspond to movement of the arm 206 as the FIG. 201 moves the arm 206 in an upward motion. Although FIG. 3 depicts a blur trajectory 304 using a straight line, a blur trajectory can have any suitable shape. Non-limiting examples of a suitable shape for a blur trajectory include a straight line, a curve, etc.

The image manipulation application 116 can apply a blurring operation to a selected portion of the image content 114 along the blur trajectory to be used for the blurring operation. In some embodiments, a blurring operation can include averaging or otherwise collecting image color values from neighboring image locations along a specified blur trajectory. A non-limiting example of a blurring operation is an operation for averaging pixel values for pixels along a blur trajectory. Non-limiting examples of pixel values include color values, intensity values, etc. For any pixel of a portion of the image content 114 to be blurred, the image manipulation application 116 can average intensity values for pixels along the blur trajectory to generate blurred image content, such as the blurred arm 302. For example, the image manipulation application 116 can average intensity values, color contributions, and/or other pixel attributes for pixels of the arm 206 along the blur trajectory 304 to generate the blurred arm 302.

In some embodiments, a blurring operation can be applied uniformly along a trajectory to generate blurred image content having a continuous motion blur. For example, pixel values can be averaged uniformly along a blur trajectory 304. In other embodiments, a blurring operation can be applied in a spatially variable manner. For example, pixel values can be averaged in a weighted manner at different portions of a blur trajectory 304.

In a non-limiting example, a blurring operation can include identifying a color value C(r) for a pixel at a location r having coordinates (x, y) in a digital image. The blurring operation can also include identifying color contributions from pixels at predetermined intervals (e.g., every 5th pixel or every 12th pixel) along the blur trajectory 304. A blur kernel at pixel location r can be specified by the set of coordinate displacements $\{d_{r,a}\}$ for a=1, 2, . . . N. The set may differ from pixel to pixel. The set of coordinate displacements can represent or otherwise describe a discrete representation of the sampling along the blur trajectory. Simulation of a continuous motion blur can be simulated by densely sampling along the trajectory. Strobe simulation can be performed by sampling from positions that are spaced at regularly spaced intervals and that are spaced further from one another as compared to the sampling for the continuous motion blur.

In a non-limiting example, a straight line may be used as the blur trajectory for a straight line path motion blur. For the straight line path motion blur, the displacements can be represented using the function $d_{r,a}=t_a v$. v can be represent a speed of the motion blur. The speed v can be used to determine the length of blur. $t_a$ can be a time parameter having a value ranging from 0 to 1. For evenly spaced sampling, the time parameter $t_a$ can be proportional to the sample index, a such that $$\frac{v}{N-1} = 1/2.$$

For a continuous blur, a number of sample points N can be selected such that every pixel along the blur trajectory is sampled. For example, the image manipulation application 116 can sample pixels with a sampling spacing of 0.5 pixels in length. For a sampling spacing of 0.5 pixels in length, the speed v can be determined from the function $$t_a = \frac{(a-1)}{(N-1)}.$$

The number of sample points N can thus be determined from the function N=1+2v. An example value of v may be 100 pixels (i.e., a motion blur having a length of 100 pixels). For v=100, N=201 sample points can provide half-pixel spacing. The image manipulation application 116 can perform strobe simulation sampling by selecting a value of N that is smaller than a value of N used for the continuous blur. For example, selecting N=4 can simulate four strobe flashes and selecting N=10 can simulate ten strobe flashes. A continuous blurred image can be obtained by averaging the colors of the set of pixels displaced from location r. The continuous blurred image $C_c(r)$ can be represented by the function $$C_c(r) = N \sum_{a=1,2,\ldots N} w_a C(r + d_{r,a})$$

α can be a normalization constant for averaging the color values together. The coefficients $w_a$ can be weights for a=1, 2, ... N such that pixel values from different groups of pixels along the blur trajectory are weighted differently in the averaging function. In some embodiments, each of the weight coefficients $w_a$ can have a value of one. In other embodiments, one or more of the weight coefficients $w_a$ can have a different weight for different positions along the blur trajectory. In some embodiments, the normalization constant can be selected or otherwise determined such that the blurred image resulting from a homogeneous color region is unchanged. For example, an un-blurred image region having a constant color can have the same constant color after a blurring operation is applied to the image region. The normalization constant α can be an inverse of the summation of weights:

$$N = \left[ \sum_{a=1,2,\ldots N} w_a \right]^{-1}$$

In additional or alternative embodiments, a blurring operation as described above can be generalized to parametric trajectories having the parametric time parameter, $t_a$. Non-limiting examples of other trajectories include quadratic Bezier curves, cubic Bezier curves, rational quadratic Bezier curves, rational cubic Bezier curves, higher order Bezier curves, higher order rational Bezier curves, etc. A quadratic Bezier curve can use a displacement vector, $d_a$ described by the function $d_a = 2 t_a (1-t_a) r_{m0} + t_a^2 r_{10}$, which can be shaped by the two vectors $r_{m0}$ and $r_{10}$. In additional or alternative embodiments, other parametric trajectory equations can be used.

The image manipulation application 116 can generate a simulated strobe flash used for applying a strobe effect. The simulated strobe flash can be generated by sampling pixels or groups of pixels from an original image along the blur trajectory. For example, pixels or groups of pixels can be sampled from the arm 206 depicted in FIG. 2 along the blur trajectory 304 depicted in FIG. 3. The positions along the blur trajectory at which the pixels or groups of pixels are sampled can simulate positions along a blur trajectory at which a physical strobe light is flashed. Any suitable function of time may be used to determine the spacing of the simulated strobe flashes.

Applying the strobe effect can also include blending or otherwise combining a simulated strobe flash $C_s(r)$ with a blurred image $C_c(r)$. Blending or otherwise combining the simulated strobe flash $C_s(r)$ with the blurred image $C_c(r)$ can be represented by the following function:

$$C_f(r) = (1-f)C_c(r) + fC_s(r).$$

The blending parameter f can control the degree to which the blurred image and the simulated strobe flash are blended. The contribution of the blurred image $C_c(r)$ to the blended image $C_f(r)$ can simulate ambient light illuminating a moving object depicted in the image. The contribution of the simulated strobe flash $C_s(r)$ to the blended image $C_f(r)$ can simulate strobe light illuminating the moving object depicted in the image.

The blending parameter f can be used to control the respective contributions of the simulated ambient light image content and the simulated strobe light image content. For example, the blending parameter f having a value of one can produce a simulated strobe image in which pixels from the simulated strobe flash are used to replace pixels from the blurred image. The blending parameter f having a value of zero can produce a fully continuous blurred image. The blending parameter f having a value between zero and one can produce an image that simulates blending of continuous ambient light contributions and discontinuous flashed strobe light contributions.

Figure 4:
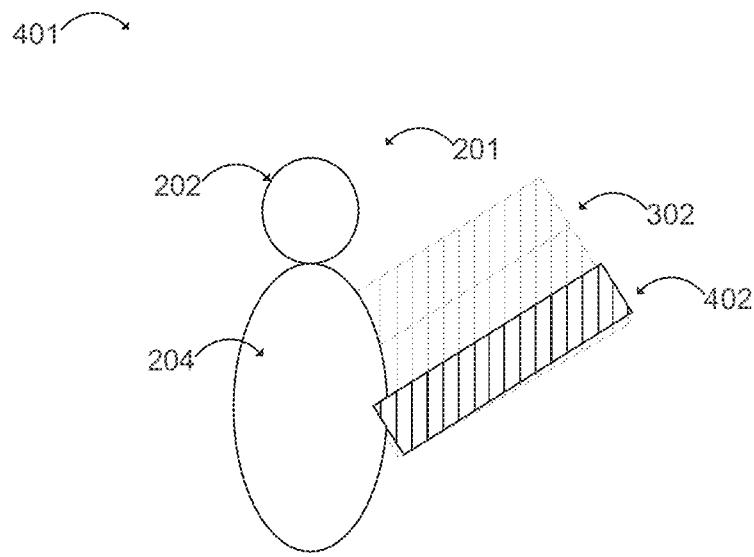
FIG. 4 is a modeling diagram depicting the blurred image content with a strobe effect applied.
Figure 5:
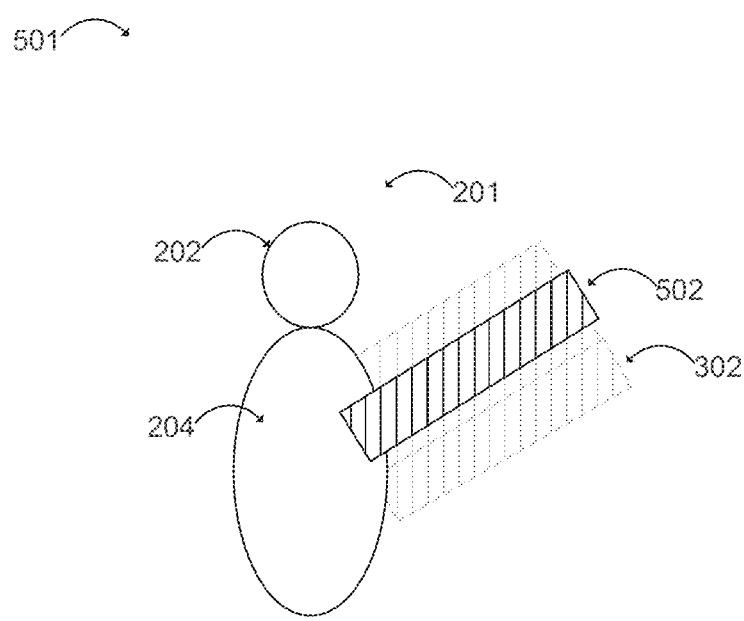
FIG. 5 is a modeling diagram depicting the blurred image content with a strobe effect applied.

FIGS. 4-5 are modeling diagram depicting the blurred image content 114 with a strobe effect applied. The non-blurred arm 402 depicted in the simulated strobe image 401 of FIG. 4 can be generated by sampling pixels from the arm 206 at a first position along the blur trajectory 304 and combining the sampled pixels with the blurred image 301. The non-blurred arm 502 depicted in the simulated strobe image 501 of FIG. 5 can be generated by sampling pixels from the arm 206 at a first position along the blur trajectory 304 and blending or otherwise combining the sampled pixels with the blurred image 301. For example, the sampled pixels can be blended with the blurred image 301 using the formula $$C_f(r) = (1-f)C_c(r) + fC_s(r)$$

In additional or alternative embodiments, any image suitable blending operation can be used to blend the blurred image 301 with the sampled pixels. For example, an image manipulation application 116 may provide operations such as "multiply," "subtract," "divide," "color blend," "lighten," "darken," "overlay," etc. for blending image content. Positioning the simulated strobe images 401, 501 in sequence can simulate multiple images captured using strobe photography and thereby provide a stop motion effect (i.e., the FIG. 201 moving the arm upward from FIG. 4 to FIG. 5).

Although FIGS. 4 and 5 depict two simulated strobe images, any number of simulated strobe images can be generated to simulate a group of images captured using a physical strobe light.

In some embodiments, a continuous simulated strobe image can be generated by selecting a constant spacing between sampled pixels or groups of pixels. In other embodiments, a non-continuous simulated strobe image can be generated in which the spacing between sampled pixels or groups of pixels is not constant. For example, the image manipulation application 116 may sample $N_1$ continuous pixels, omit the next $N_2$ samples from the sampling process, and continue alternating between sampling groups of continuous pixels and omitting other groups of pixels.

In additional or alternative embodiments, generating the simulated strobe image can include modifying strobe attributes. Modifying strobe attributes can include modifying attributes of the sampled pixels such that the sampled pixels have different image characteristics from the blurred pixels. Non-limiting examples of modifying strobe attributes include modifying a simulated flash duration, modifying a spacing between simulated strobe flashes, modifying a color balance for the sampled pixels, modifying a vibrancy of the sampled pixels, modifying a contrast of the sampled pixels, modifying a brightness of the sampled pixels, a curve adjustment, etc. A simulated flash duration can be increased or decreased by respectively increasing or decreasing the number of pixels sampled at a position along the blur trajectory 304. A spacing of simulated strobe flashes can be increased or decreased by respectively increasing or decreasing the rate at which pixels are sampled along the blur trajectory 304. Use of a colored strobe light can be simulated by modifying the coloration of the sampled pixels.

Figure 6:
FIG. 6 is a photograph depicting example image content to which strobe effects may be applied.

FIG. 6 is a photograph depicting example image content 602 to which strobe effects may be applied. The image content 602 can include a wheel having spokes.

Figure 7:
FIG. 7 is a photograph depicting example blurred image content without application of strobe effects.

FIG. 7 is a photograph depicting example blurred image content 702 without application of strobe effects. The image content 702 can be generated by applying a continuous blur effect to the image content 602. For example, the spokes of the wheel can be selected for blurring. A blurring operation can be applied to the spokes of the wheel along a blur trajectory corresponding to the motion of the spokes as the wheel spins, such as an arc in a clock wise or counter-clockwise direction.

Figure 8:
FIG. 8 is a photograph depicting the example image content with partial strength strobe effects applied.

FIG. 8 is a photograph depicting the example image content 802 with partial strength strobe effects applied. The number of strobe effects applied to the image content 702 can correspond to the number of positions along the blur trajectory from which pixels are sampled. For example, the image content 802 can be generated by applying four partial strength strobe effects to the image content 702 (i.e., sampling pixels from four different positions along the blur trajectory). Samples from the image 602 can be taken from four positions along the blur trajectory to generate four strobe effects. Applying a partial strength strobe effect can include blending both a blurred contribution (i.e., a continuous ambient light effect) and a simulated strobe contribution. Applying both a continuous ambient light effect and a simulated strobe contribution can include selecting a value of a blending parameter f between zero and one. For example, selecting a value of a blending parameter f can generate the image content 802 depicted in FIG. 8 that includes both a continuous ambient light effect (e.g., 70% strength) and a strobe effect (e.g., 30% strength).

In some aspects, the image manipulation application 116 can provide a graphical interface allowing a user to configure the strobe effect. For example, a graphical interface can allow a user to select different ambient light values (i.e., different values of a blending parameter f) and/or a number of simulated flashes to be applied to the input image.

Figure 9:
FIG. 9 is a photograph depicting the example blurred image content with full strength strobe effects applied.

FIG. 9 is a photograph depicting example image content 902 with full strength strobe effects applied. For example, the image content 902 can be generated by applying four full strength strobe effects to the image content 702. The image content 902 does not include a continuous ambient light effect. The full strength strobe effect can be obtained by setting a blending parameter f to a value of one. The absence of the continuous ambient light effect can cause the spokes of the wheel depicted in the image content 902 to have a more sharply defined appearance as compared to the spokes of the wheel depicted in the image content 802 generated using a continuous ambient light effect.

Figure 10:
FIG. 10 is a photograph depicting the example image content with additional full strength strobe effects applied.

FIG. 10 is a photograph depicting the example image content 1002 with additional full strength strobe effects applied. For example, the image content 1002 can be generated by applying ten full strength strobe effects to the image content 702. The blending parameter f can be set to one such that the image content 1002 depicted in FIG. 10 does not include a continuous ambient light effect. Applying additional strobe effects (i.e., increasing the number of positions along the blur trajectory from which pixels are sampled) to generate the image content 1002 as compared to the image content 902 can cause the spokes depicted in the image content 1002 to appear with a closer spacing as compared to the image content 902.

Figure 11:
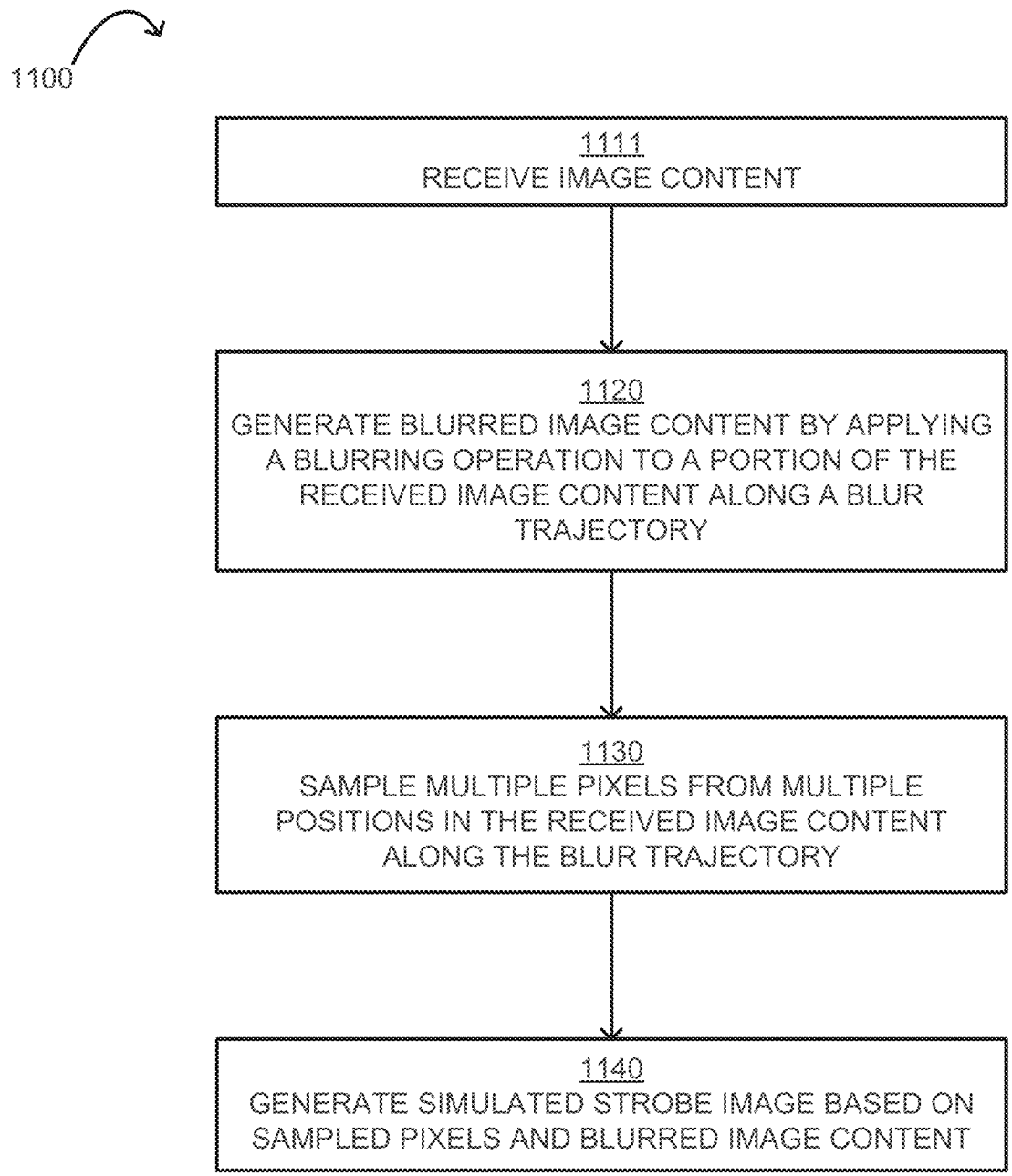
FIG. 11 is a flow chart illustrating an example method for simulating strobe effects with digital image content.

FIG. 11 is a flow chart illustrating an example method 1100 for simulating strobe effects with digital image content. For illustrative purposes, the method 1100 is described with reference to the system implementation depicted in FIG. 2 and the operations described with respect to FIGS. 3-10. Other implementations, however, are possible.

The method 1100 involves receiving image content 314, as shown in block 1110. The processor 104 of the computing system 102 can execute the image manipulation application 116 or other suitable programming instructions to receive the image content 314.

The method 1100 further involves generating blurred image content by applying a blurring operation to a portion of the received image content along a blur trajectory, as shown in block 1120. The processor 104 of the computing system 102 can execute the image manipulation application 116 or other suitable programming instructions to apply the blurring image operation. In one non-limiting example, the image manipulation application 116 can apply a blurring operation to the arm 206 of the FIG. 201 depicted in FIG. 2 to generate the blurred arm 302 depicted in FIG. 3. In another non-limiting example, the image manipulation application 116 can apply a blurring operation to the spokes of the wheel depicted in FIG. 6 to generate the blurred image content depicted in FIG. 7.

In some embodiments, the blurred image content can be generated by applying a blurring operation to multiple portions of an image along multiple trajectories. For example, the image manipulation application 116 can apply a blurring operation to an image depicting a person with two extended arms. The blurring operation can be applied to a first portion of the image along a first blur trajectory, such as a first one of the arms depicted in the image. The blurring operation can also be applied to a second portion of the image along a second blur trajectory, such as a second one of the arms depicted in the image.

In some embodiments, the blurring operation can include uniformly averaging pixel values for pixels along the blur trajectory. In other embodiments, the blurring operation can include performing weighted averaging of pixel values for pixels along the blur trajectory.

The method 1100 further involves sampling multiple pixels from multiple positions in the received image content along the blur trajectory, as shown in block 1130. The processor 104 of the computing system 102 can execute the image manipulation application 116 or other suitable programming instructions to sample the pixels as described above with respect to FIGS. 4-5 and 8-10.

The method 1100 further involves generating a simulated strobe image based on the pixels sampled from the received image content and at least some of the blurred image content, as shown in block 1140. The processor 104 of the computing system 102 can execute the image manipulation application 116 or other suitable programming instructions to generate the simulated strobe image as described above with respect to FIGS. 4-5 and 8-10. In some embodiments, generating the simulated strobe image can include blending the sampled pixels with the blurred image content.

For cases in which multiple blurring trajectories are used to generate a blurred image with multiple blurred image portions, the image manipulation application 116 can apply the strobe effect along each of the blurring trajectories. For example, the image manipulation application 116 can sample pixels from the received image content along each of the blur trajectories and blend the pixels sampled from each blur trajectory with the blurred image content along the respective blur trajectory.

The image manipulation application 116 can sample pixels along the blur trajectory in any suitable manner. In some embodiments, the image manipulation application 116 can sample pixels at uniform intervals along the blur trajectory. Sampling pixels at uniform intervals can be used to simulate an object moving at a constant velocity. In other embodiments, the image manipulation application 116 can sample pixels at intervals determined by applying a mathematical function with respect to the blur trajectory. Non-limiting examples of such a mathematical function include a quadratic function, an exponential function, a logarithmic function, etc. Sampling pixels from algorithmically determined positions along the blur trajectory can be used to simulate an accelerating object moving at different velocities along the blur trajectory. In other embodiments, the image manipulation application 116 can sample pixels at random intervals along the blur trajectory.

In some embodiments, blending the sampled pixels with the blurred image content can include applying a blending function having a blending parameter that controls relative contributions of the blurred image pixels and the sampled pixels to a simulated strobe image. In one non-limiting example, a blending parameter may have a value (e.g., f=1) specifying that the image manipulation application 116 is to use pixel values from a sampled pixel along the blur trajectory to replace pixel values from a corresponding blurred pixel along the blur trajectory. The contribution of the sampled pixels simulating objects illuminated by a strobe flash can thus replace a corresponding contribution of blurred pixels simulating the objects as illuminated by ambient light. In another non-limiting example, a blending parameter may have a value (e.g., 0<f<1) specifying that the image manipulation application 116 is to use a combination of pixel values from a sampled pixel along the blur trajectory and pixel values from a corresponding blurred pixel along the blur trajectory. The contributions of the sampled pixels simulating objects illuminated and the corresponding blurred pixels simulating the objects as illuminated by ambient light can be weighted and combined to obtain pixel values for the simulated strobe image.

Figure 12:
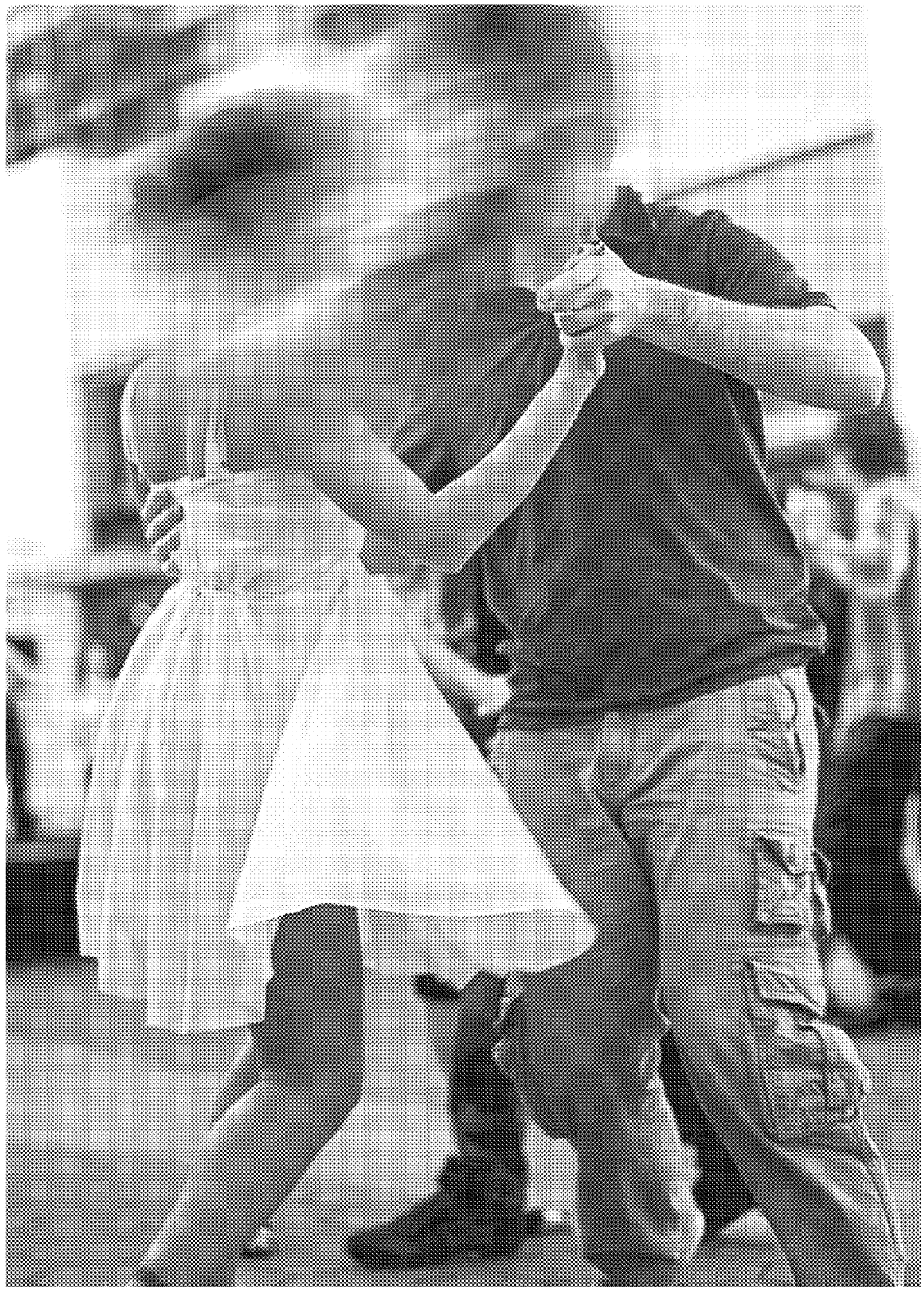
FIG. 12 is a photograph depicting example image content to which strobe effects may be applied.

Although the simulation of strobe effects has been described above with respect to FIGS. 6-10 above using relatively symmetrical objects, the image manipulation application 116 can also apply simulated strobe effects to complex or irregularly shaped objects depicted in an image. For example, FIG. 12 is a photograph depicting example image content 1202 to which strobe effects may be applied. The image content 1202 can be, for example, a picture of two dancers captured as the dancers are in mid-step.

Figure 13:
FIG. 13 is a photograph depicting multiple examples of blurred image regions without application of strobe effects.

FIG. 13 is a photograph depicting blurred image content 1302 without application of strobe effects. The photograph 1302 can be generated by applying a blurring function to the image content 1202. The blurring function can include multiple blur trajectories corresponding to the movement of different parts of the dancers' bodies. For example, a blurring function can be applied to the dancers' arms along one or more curved trajectories to simulate movement of the dancers' arms. The blurring function can be applied to the dancers' legs along one or more horizontal trajectories to simulate movement of the dancers' legs or feet.

Figure 14:
FIG. 14 is a photograph depicting the example image content with partial strength strobe effects applied.

FIG. 14 is a photograph 1402 depicting the example image content with partial strength strobe effects applied. The image content 1402 can be generated by applying partial strength strobe effects to the image content 1302. Applying a partial strength strobe effect can include blending both a blurred contribution (i.e., a continuous ambient light effect) and a simulated strobe contribution. Applying both a continuous ambient light effect and a simulated strobe contribution can include selecting a value of a blending parameter f between zero and one. For example, selecting a value of a blending parameter f can generate the image content 1402 depicted in FIG. 14 that includes both a continuous ambient light effect (e.g., 75% strength) and a strobe effect (e.g., 35% strength).

Figure 15:
FIG. 15 is a photograph depicting the example blurred image content with full strength strobe effects applied.

FIG. 15 is a photograph 1502 depicting the example blurred image content with full strength strobe effects applied. For example, the image content 1502 can be generated by applying full strength strobe effects to the image content 1302. The image content 1502 does not include a continuous ambient light effect. The full strength strobe effect can be obtained by setting a blending parameter f to a value of one. The absence of the continuous ambient light effect can cause the dancer's limbs as depicted in the image content 1502 to have a more sharply defined appearance as compared to the spokes of the wheel depicted in the image content 1402 generated using a continuous ambient light effect.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
receiving image content;
generating, by an image manipulation application, blurred image content by applying a blurring operation to a portion of the received image content along a blur trajectory;
sampling, by the image manipulation application, a plurality of pixels from a plurality of positions in the received image content along the blur trajectory;
generating, by the image manipulation application, a simulated strobe image based on the plurality of pixels sampled from the received image content and at least some of the blurred image content.

2. The method of claim 1, wherein generating the simulated strobe image comprises blending the plurality of pixels sampled from the received image content with the blurred image content.

3. The method of claim 1, wherein generating the simulated strobe image comprises replacing pixel values for pixels from the blurred image content at the plurality of positions along the blur trajectory with pixel values from the plurality of pixels sampled from the received image content.

4. The method of claim 1, wherein generating the simulated strobe image comprises blending pixel values from the plurality of pixels sampled from the received image content with pixel values for corresponding pixels from the blurred image content at the plurality of positions along the blur trajectory.

5. The method of claim 1,
wherein generating the blurred image content further comprises applying the blurring operation to an additional portion of the received image content along an additional blur trajectory;
wherein generating the simulated strobe image further comprises:
sampling an additional plurality of pixels from the received image content along the additional blur trajectory, and
generating at least one of the simulated strobe image by blending the additional plurality of pixels sampled with the blurred image content along the additional blur trajectory.

6. The method of claim 1, wherein the blurring operation comprises uniformly averaging pixel values for an additional plurality of pixels along the blur trajectory.

7. The method of claim 1, wherein the blurring operation comprises performing weighted averaging of pixel values for an additional plurality of pixels along the blur trajectory.

8. The method of claim 1, wherein sampling the plurality of pixels from the plurality of positions in the received image content comprises sampling pixels at uniform intervals along the blur trajectory.

9. The method of claim 1, wherein sampling the plurality of pixels from the plurality of positions in the received image content comprises randomly sampling pixels intervals along the blur trajectory.

10. The method of claim 1, wherein sampling the plurality of pixels from the plurality of positions in the received image content comprises determining the plurality of positions based on at least one of a logarithmic function or a quadratic function identifying the plurality of positions along the blur trajectory.

11. The method of claim 1, further comprising modifying coloration values for the plurality of pixels sampled from the received image content and wherein generating the simulated strobe image further comprises blending the plurality of pixels having modified coloration values with the blurred image content.

12. The method of claim 1, wherein the blur trajectory comprises a straight line segment trajectory.

13. The method of claim 1, wherein the blur trajectory comprises a quadratic Bezier trajectory.

14. The method of claim 1, wherein the blur trajectory comprises a cubic Bezier trajectory.

15. The method of claim 1, wherein the blur trajectory comprises a parametric curve.

16. A non-transitory computer-readable medium tangibly embodying program code executable by a processor for providing an image manipulation application, the program code comprising:
program code for receiving image content;
program code for generating blurred image content by applying a blurring operation to a portion of the received image content along a blur trajectory;
program code for sampling a plurality of pixels from a plurality of positions in the received image content along the blur trajectory;
program code for generating a simulated strobe image based on the plurality of pixels sampled from the received image content and at least some of the blurred image content.

17. The non-transitory computer-readable medium of claim 16, wherein generating the simulated strobe image comprises blending the plurality of pixels sampled from the received image content with the blurred image content.

18. The non-transitory computer-readable medium of claim 16,
wherein generating the blurred image content further comprises applying the blurring operation to an additional portion of the received image content along an additional blur trajectory;
wherein generating the simulated strobe image further comprises:
sampling an additional plurality of pixels from the received image content along the additional blur trajectory, and
generating at least one of the simulated strobe image by blending the additional plurality of pixels sampled with the blurred image content along the additional blur trajectory.

19. The non-transitory computer-readable medium of claim 16, wherein sampling the plurality of pixels from the plurality of positions in the received image content comprises sampling pixels at uniform intervals along the blur trajectory.

20. The non-transitory computer-readable medium of claim 16, wherein sampling the plurality of pixels from the plurality of positions in the received image content comprises randomly sampling pixels intervals along the blur trajectory.

21. The non-transitory computer-readable medium of claim 16, wherein sampling the plurality of pixels from the plurality of positions in the received image content comprises determining the plurality of positions based on at least one of a logarithmic function or a quadratic function identifying the plurality of positions along the blur trajectory.

22. The non-transitory computer-readable medium of claim 16, further comprising program code for modifying coloration values for the plurality of pixels sampled from the received image content and wherein generating the simulated strobe image further comprises blending the plurality of pixels having modified coloration values with the blurred image content.

23. The non-transitory computer-readable medium of claim 16, wherein the blurring operation comprises at least one of uniformly averaging pixel values for an additional plurality of pixels along the blur trajectory and performing weighted averaging of pixel values for an additional plurality of pixels along the blur trajectory.

24. A system comprising:
   a processor; and
   a non-transitory computer-readable medium communicatively coupled to the processor;
   wherein the processor is configured to execute an image manipulation application embodied in the non-transitory computer readable medium, wherein executing the image manipulation application configures the process to perform operations comprising:
   receiving image content;
   generating blurred image content by applying a blurring operation to a portion of the received image content along a blur trajectory;
   sampling a plurality of pixels from a plurality of positions in the received image content along the blur trajectory;
   generating a simulated strobe image based on the plurality of pixels sampled from the received image content and at least some of the blurred image content.

\* \* \* \* \*